No. 635,966. Patented Oct. 31, 1899.
A. H. KOHLMEYER & W. F. STEWART.
FILTER.
(Application filed Feb. 13, 1899.)
(No Model.) 3 Sheets—Sheet 2.
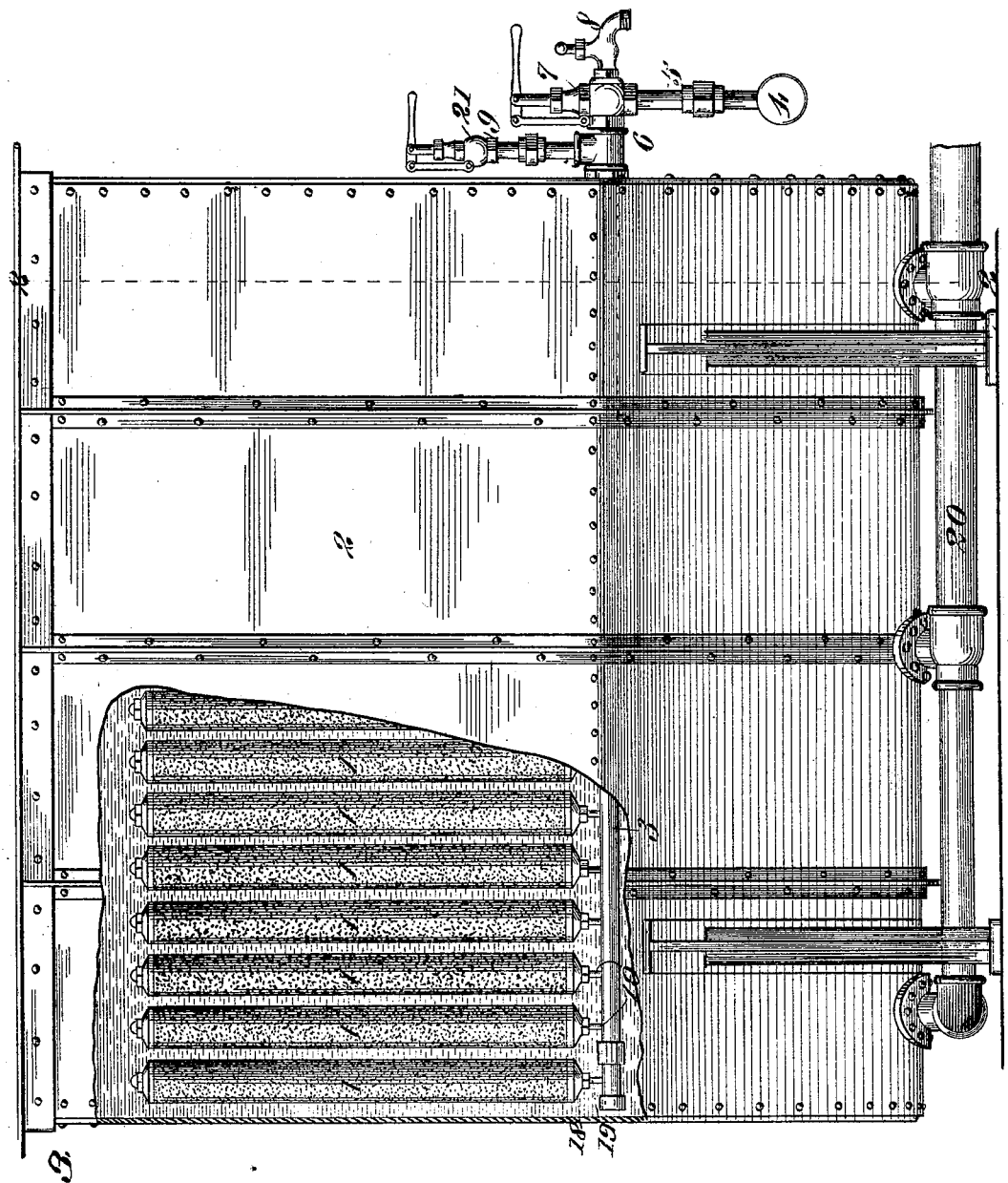
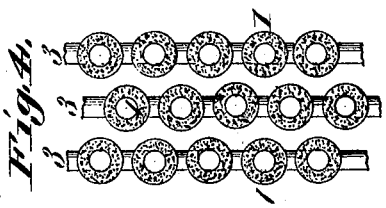

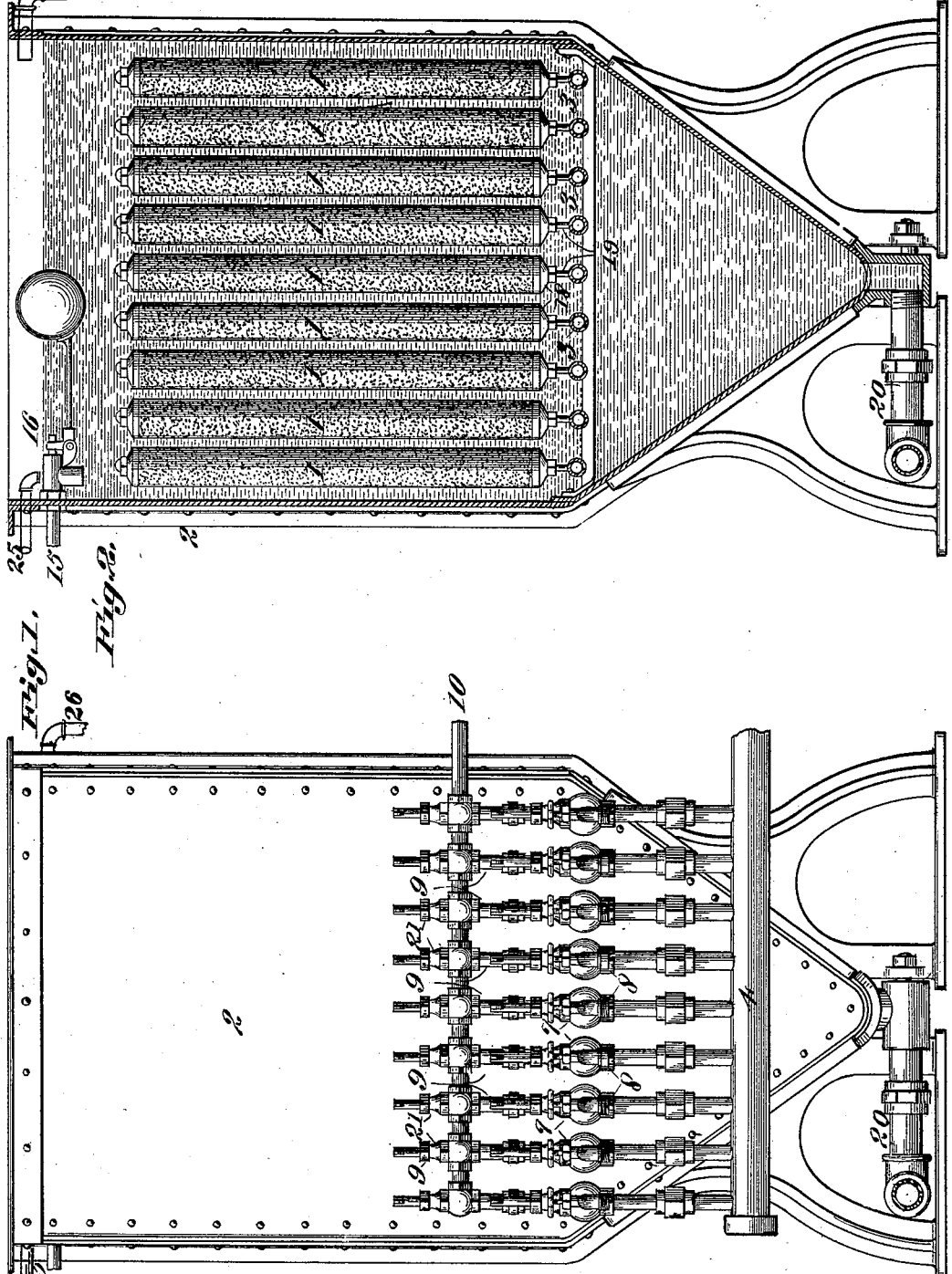

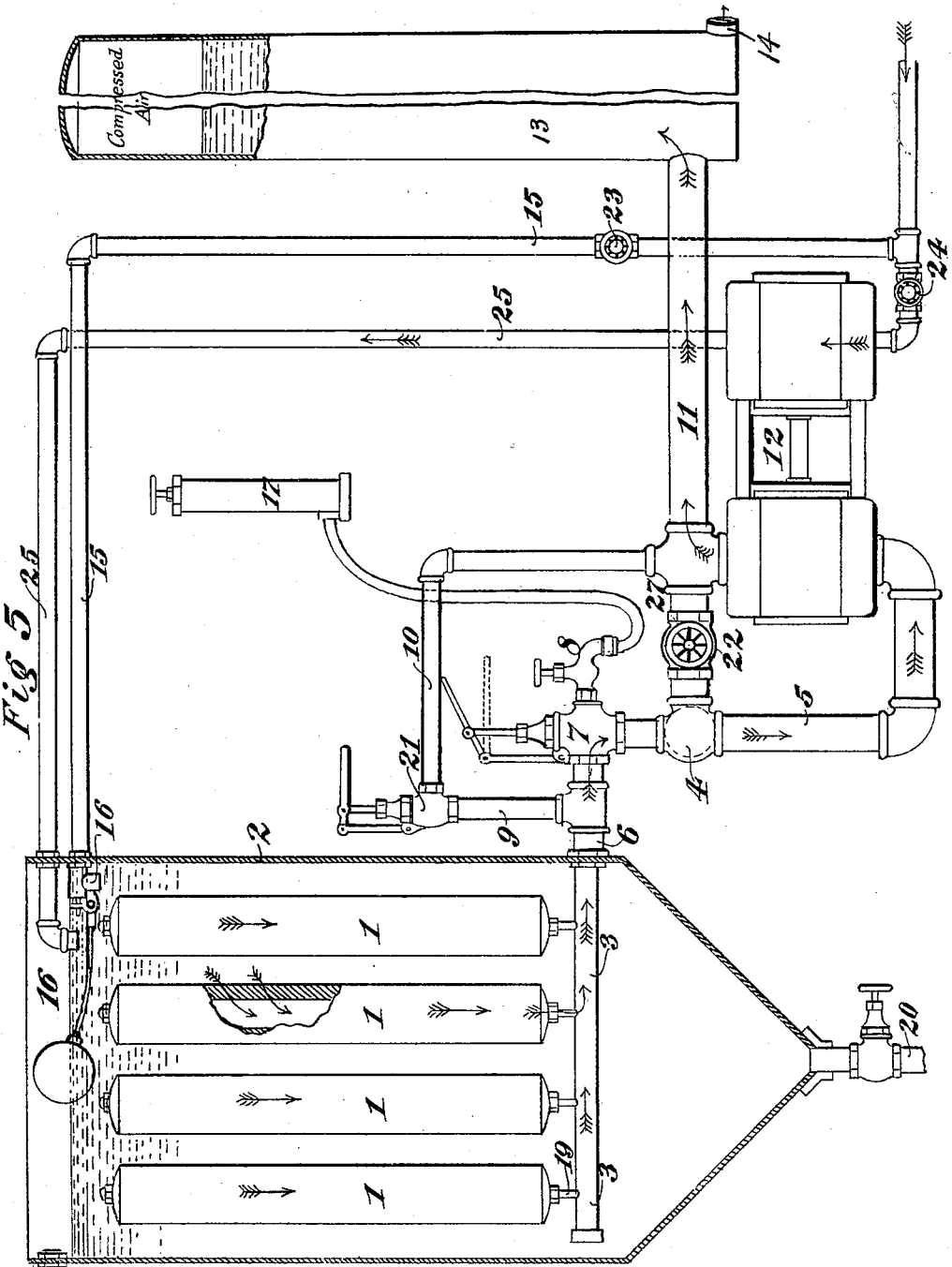

UNITED STATES PATENT OFFICE.

AUGUST H. KOHLMEYER AND WILLIAM F. STEWART, OF ST. LOUIS, MISSOURI.

FILTER.

SPECIFICATION forming part of Letters Patent No. 635,966, dated October 31, 1899.

Application filed February 13, 1899. Serial No. 705,390. (No model.)

*To all whom it may concern:*

Be it known that we, AUGUST H. KOHLMEYER, a citizen of the United States, and WILLIAM F. STEWART, a subject of Her Majesty the Queen of Great Britain, both residents of the city of St. Louis and State of Missouri, have invented a certain new and useful Improvement in Filters, of which the following is a specification.

Our invention relates to filters, and has for its principal objects to secure the advantages of high-pressure filtration in a filter of the low-pressure type.

Another object is to enable one portion of the filter to be cleansed, scraped, or repaired without stopping the regular operation of the other portion.

In the accompanying drawings, which form part of this specification, and wherein like symbols refer to like parts wherever they occur, Figure 1 is an end elevation of the filter-tank. Fig. 2 is a cross-section thereof. Fig. 3 is a side elevation thereof with a portion broken away. Fig. 4 is a horizontal detail section showing the arrangement of filter-stones, and Fig. 5 is a diagrammatic representation of the entire system.

The filtering medium consists of filter stones or tubes 1, arranged in groups or series in a tank 2 of any kind suitable for a low-pressure filter system. Each group or series of stones has a separate manifold or collecting-pipe 3, to which all the stones in that group are connected, and these collecting-pipes 3 extend through the side of the tank and are all connected to a larger manifold 4, communicating with the outlet-pipe 5 for filtered water. In each of the pipes 6, which connect the group manifolds or collecting-pipes 3 with the general manifold, is a valve 7, whereby each group can be cut off from the general manifold. Each of said connecting-pipes 6 also has a faucet 8, threaded for a hose-coupling, said faucet being so located as to communicate with the filter-tank whether the valve 7 is open or closed. Each of said connecting-pipes 6 is also fitted with a valved pipe 9, connected through an intermediate pipe 10 to the outlet-pipe 11 of the pump 12, said valved pipe 9 being located between the filter and the valve 7.

The outlet-pipe 5 for filtered water is connected to the suction side of a pump 12, through which it communicates with a storage-tank 13, to which the service-pipe 14 is connected. The form of pump which we contemplate using is an automatic water-motor connected to the main supply-pipe of the system and driven by the pressure of water in said supply-pipe. Such motors are well known and require no special description. As the motor is located in the supply-pipe, the water which drives it passes on to the filter-tank. In order to economize water, the piston of the motor-cylinder and the piston of the pump driven thereby are preferably of approximately the same area.

In order to make good the loss of water due to the operation of cleansing and other causes and to keep the water in the tank up to a predetermined level, a branch pipe 15 leads from the main supply-pipe into the tank and is controlled by a float-valve 16 therein. It is desirable to provide the supply-pipe 25 and the pipe leading from the main supply-pipe to the pump with a valve 24 and the branch pipe 15 with valve 23, as shown. The tank is also provided with an ordinary overflow-pipe 26 for carrying off the excess water.

For the purpose of permitting a general wash of all the stones the outlet-pipe of the pump is connected to the general manifold by a pipe 27, provided with any suitable valve 22.

The operation of the foregoing arrangement is as follows: The water enters the filter-tank 2 from any convenient source of supply, such as a branch pipe 15, controlled by a float-valve 16 in said tank. When the valve 24 in the supply-pipe to the water-motor is opened, the pump in the outlet-pipe is set in motion and the suction thereof reduces the pressure on the interior of the filter-stone with the same effect as if there was an initial pressure in the tank equal to the amount of such reduction. Water is thus sucked through the walls of the filter-stones, leaving the suspended matter on outer surface of same. The filtered water thus drawn through the suction-pipe of the pump is forced into the storage-tank, from which it is drawn as required. During this operation the faucets 8 and valves 21 in the intermediate pipes 10 between the outlet-pipe of the pump and the filter-tank remain normally closed; but in case it is desired to test for a leak each of the pipes connecting the group manifolds with the general manifold is successively cut off by manipulating the valve therein, and then an air-pump is applied to the threaded faucet thereof and the faucet opened. By manipulating the air-pump 17 air is forced back through the particular group manifold, thence into the filter-stones. In case any of said stones are cracked or any of the joints are leaking the air will escape rapidly therethrough and bubble up through the water, and thus indicate the location of the leak, for the cover of the tank, if it has any, is removed for such inspection. The faucet is then shut off and the defective stone is unscrewed and replaced with a new one merely by screwing the cap 18 of the new one into the fitting 19 on the collecting-manifold, which may be done without emptying the tank or interfering with the operation of the other groups of stones. For the purpose of thus removing and replacing filter-stones each stone is fitted at its lower end with a metal cap 18, having a hollow threaded stem projecting therethrough, and the group manifolds are provided with threaded sockets or fittings adapted to receive such stones.

In order to cleanse all of the filter-stones at once, the valve 22 in the pipe 27, connecting the outlet side of the pump with the general manifold, is opened, and the air compressed in the storage-tank forces filtered water back through said manifold and the filter-tubes connected thereto. At the same time the valve in the waste-pipe should be opened to carry off the sediment and muddy water.

In order to cleanse one section of the filter separately, the valve in the water-pipe 27 is opened, and at the same time the valve 7, controlling the connection between one group manifold and the general manifold, is closed and the valve 21, controlling the connection between that group manifold and the outlet-pipe of the pump, is opened. Then the pump, together with the compressed air in the storage-tank, forces clear water back through the filter-stones of that particular group, while the overflow-pipe 26 carries off the excess of water thus forced back into the tank without requiring the waste-pipe 20 to be opened. At the same time the other groups of stones remain in operation. In the same way each of the stones may be brushed or scraped separately without interfering with the operation of the others, because the interior of the tank is accessible during the operation of filtration.

What we claim is—

1. A filter system comprising a low-pressure filter-tank, a filtering medium therein arranged in independent sections, a pump in the outlet-pipe and means for reversing the current in each section independently, substantially as described.

2. A filter system comprising a low-pressure filter-tank, a filtering medium therein and a pump connected both on the suction side and on the outlet side to the outlet-pipe for filtered water, and means for controlling such connections, whereby the current through the filtering medium may be reversed substantially as described.

3. A filter system comprising a low-pressure filter-tank, groups of filter-stones therein independently connected to the outlet-pipe, a pump connected through intermediate pipes both on its suction side and on its outlet side to the groups of filter-stones, and valves at all of said connections, substantially as described.

4. A filter system comprising a low-pressure filter-tank, groups of filter-stones therein independently connected to the outlet-pipe, a valve in each of said connections and a faucet between each of said valves and the filter-tank adapted to be coupled to an air-pump, substantially as and for the purpose set forth.

5. A filter system comprising a filter-tank, a supply-pipe therefor, a water-motor connected to said supply-pipe and driven by the water therein, an outlet-pipe, and a pump therein driven by said water-motor, substantially as described.

6. A filter system comprising a filter-tank, a supply-pipe therefor, an automatic water-motor connected to said supply-pipe and driven by the water therein, an outlet-pipe, and a pump therein driven by said water-motor, substantially as described.

7. A filter system comprising a filter-tank, a supply-pipe therefor, an automatic water-motor connected to said supply-pipe and driven by the water-motor connected to said supply-pipe and driven by the water therein, an outlet-pipe, and a pump therein driven by said water-motor, the piston of said motor and the piston of said pump being of approximately the same area, substantially as described.

AUGUST H. KOHLMEYER.
WM. F. STEWART.

In presence of—
JOHN B. RENO,
JAMES A. CARVER.